May 3, 1960 G. LIVERSAGE 2,935,347
RESILIENT SUSPENSION JOINTS
Filed Oct. 13, 1958
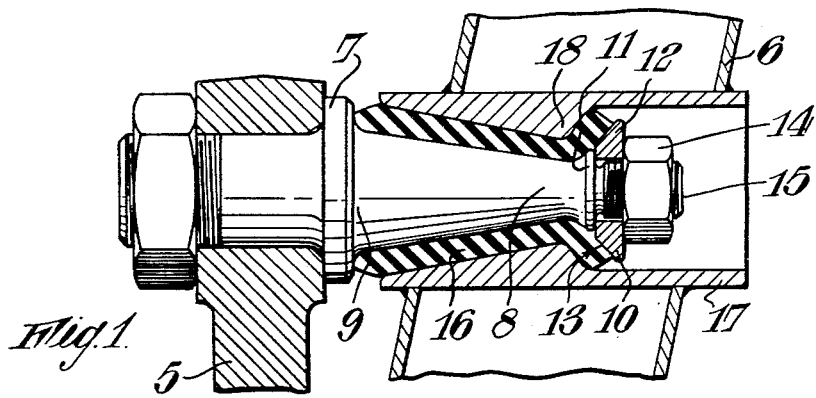
Fig.1
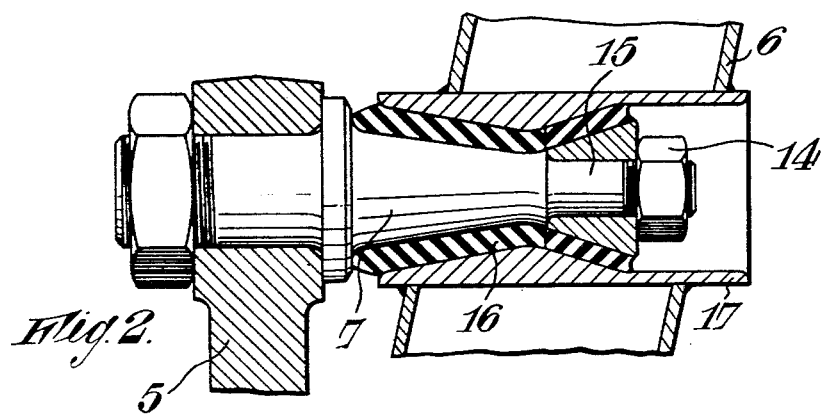
Fig.2
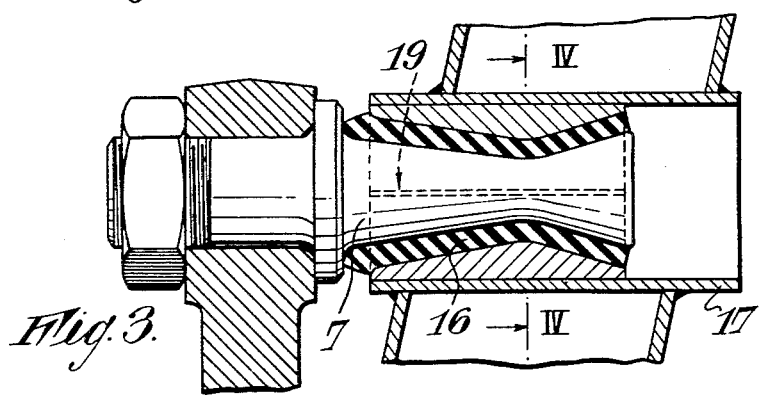
Fig.3
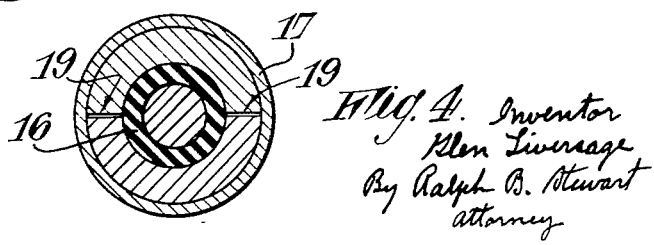
Fig.4. Inventor
Glen Liversage
By Ralph B. Stewart
attorney they # United States Patent Office 2,935,347
Patented May 3, 1960

2,935,347
RESILIENT SUSPENSION JOINTS

Glen Liversage, Leicester, England, assignor to Metalastik Limited, Leicester, England, a British company Application October 13, 1958, Serial No. 766,880

Claims priority, application Great Britain November 21, 1957

5 Claims. (Cl. 287—85)

This invention concerns resilient joints, more particularly for independent front wheel suspensions of automobiles.

According to this invention a resilient joint comprises a double taper pin, a correspondingly formed sleeve within which the pin lies with an annular space therebetween and a rubber bushing in said space and compressed between the pin and the sleeve, the pin and/or the sleeve being in at least two parts for assembly of the joint.

It is a preferred feature of the present invention that the rubber bushing is bonded to the pin.

By a "double-taper pin" is meant a pin having a waist inwardly of its two ends.

Practical application of the present invention will now be described, by way of example only, with reference to the accompanying drawings whereof:

Fig. 1 is a sectional elevation of a resilient joint in accordance with this invention, Figs. 2 and 3 are views similar to Fig. 1 showing alternative constructions, and Fig. 4 is a section on the line IV—IV of Fig. 3.

Referring to Fig. 1 of the drawings: the resilient joint is provided between an arm 5 and a frame 6, such as the chassis frame of a vehicle. The arm 5 carries a pin 7 having a waist 8 inwardly of the ends of the pin, the pin being of double-taper form. The length of the pin from the waist 8 to the attachment end 9 is considerably greater than the length from waist 8 to the end 10. The diameters of the ends 9 and 10 are substantially the same. The portion of the pin between the waist 8 and the end 10 is in two parts. The first part (indicated at 11) is integral with the main body of the pin. The part 11 has a tapering outer surface. A ring 12 is co-axially mounted on the part 11 and the outer surface 13 of the ring constitutes a continuation of the tapering surface of the part 11. The ring 12 is held in position by a nut 14 secured to a stud 15 constituting an extension of the pin 7.

A one-piece rubber bushing 16 is bonded to the pin 7, the arrangement being that a portion of the rubber bushing projects axially beyond the part 11 of the pin.

The assembly comprising the bushing 16 and pin 7 is received by a one-piece sleeve 17 which is welded, or similarly carried, by the frame 6. The sleeve 17 is of complementary shape to the pin 7 i.e. its inner surface is of a corresponding double-taper form. The pin, with the bushing 16 thereon, is inserted axially on the sleeve 17 and before the ring 12 is assembled. Thereafter the ring 12 is placed on the stud 15 and the nut 14 is drawn up, with the result that the portion of the rubber bushing 16 which projects beyond the part 11 of the pin 7 is forced outwardly and is clamped between the ring 12 and a shoulder 18 of the sleeve 17. As the nut 14 is tightened up the rubber bushing is compressed between the sleeve 17 and the pin 7, compression being applied to the rubber bushing between both tapering surfaces of the pin and of the sleeve.

Fig. 2 illustrates an arrangement similar to Fig. 1 wherein, however, the waist is near the centre of the pin and the ring has a corresponding greater axial dimension. The bushing 16 is also in two sleeve parts, which abut end to end near the waist, each of the sleeve parts being preferably bonded to the corresponding part of the pin.

In the arrangement of Figs. 3 and 4 a one-piece pin 7 is provided and the bushing 16 is also in one piece and bonded thereto. In order to mount the assembly comprising the pin 7 and the bushing 16 within the sleeve 17 the sleeve is formed as a plain cylindrical shell having two separate inner sleeve forming parts split, as at 19 in Fig. 4, in a diametral plane (i.e. axially of the pin). The pin and rubber bushing is assembled between the inner sleeve forming parts and thereafter the assembly is inserted within the cylindrical shell whereby the inner sleeve forming parts are clamped together to compress the bushing 16 against the pin.

With each of the arrangements described the torsional stiffness is low. Since the rubber bushing is directly secured to the pin (i.e. there is no intervening metal sleeve) the diameter of the assembly can be reduced as compared with known arrangements and therefore the torsional stiffness is less than with known arrangements incorporating an intervening sleeve. This is an advantage with independent front wheel suspensions. The radial stiffness is relatively high since the rubber bushing 16 then acts mainly in compression. The rubber bushing 16, when subjected to axial loading in either direction, acts in compression in addition to tension and therefore the axial stiffness is high.

I claim:

1. A joint for resiliently connecting a pair of elements, comprising a double-taper pin adapted for connection at one end to one of the elements to be joined, the pin being waisted inwardly of its ends, a sleeve for connection to the other of the elements to be joined, the sleeve surrounding the pin and having an inner surface of double tapered form complementary with that of the pin and defining with the pin an annular space, and a rubber bushing in said space and extending on each side of the waist of the pin, the bushing being held compressed directly between the pin and the sleeve.

2. A joint for resiliently connecting a pair of elements, comprising a double-taper pin adapted for connection at one end to one of the elements to be joined, the pin being waisted inwardly of its ends and having a part at its other end formed as a threaded stud and a tapered intermediate portion tapering towards the stud, the pin comprising a conic ring secured on the stud and tapering towards said one end of the pin, and the joint further comprising a one-piece sleeve for connection to the other of the elements to be joined, the sleeve surrounding the pin and having an inner surface of double tapered form complementary with that of the pin and defining with the pin an annular space, and a rubber bushing in said space and extending on each side of the waist of the pin, the bushing being held compressed directly between the pin and the sleeve.

3. A joint for resiliently connecting a pair of elements, comprising a double-taper pin adapted for connection at one end to one of the elements to be joined, the pin being waisted inwardly of its ends near to the other end of the pin and having a part at its other end formed as a threaded stud, a tapered intermediate portion tapering towards the stud, and an adjacent tapered intermediate portion between said first said portion and the stud and tapering towards said one end of the pin, said intermediate portions joining at the waist, the pin comprising a conic ring secured on the stud, the ring tapering towards said one end of the pin and forming a continuation of said adjacent tapered intermediate portion, the joint further comprising a one-piece sleeve for connection to the other of the elements to be joined, the sleeve surrounding the pin and having an inner surface of double tapered form complementary with that of the pin and defining with the pin an annular space, and a one-piece rubber bushing in said space and extending on each side of the waist of the pin, the bushing being held compressed directly between the pin and the sleeve.

4. A joint for resiliently connecting a pair of elements, comprising a double-taper pin adapted for connection at one end to one of the elements to be joined, the pin being waisted inwardly of its ends near to the centre of the pin and having a part at its other end formed as a threaded stud and a tapered intermediate portion tapering towards the stud, the pin comprising a conic ring secured on the stud and tapering towards said one end of the pin, and the joint further comprising a one-piece sleeve for connection to the other of the elements to be joined, the sleeve surrounding the pin and having an inner surface of double tapered form complementary with that of the pin and defining with the pin an annular space, and a rubber bushing in said space and extending on each side of the waist of the pin, the bushing being held compressed directly between the pin and the sleeve and being formed in two sleeve parts which abut end to end near the waist.

5. A joint for resiliently connecting a pair of elements, comprising a double-taper pin adapted for connection at one end to one of the elements to be joined, the pin being waisted inwardly of its ends, a sleeve for connection to the other of the elements to be joined, the sleeve surrounding the pin and comprising an outer hollow cylindrical shell and at least two separate inner sleeve forming parts split axially of the pin and having an inner surface of double tapered form complementary with that of the pin and defining with the pin an annular space, and a rubber bushing in said space and extending on each side of the waist of the pin, the bushing being held compressed directly between the pin and said inner sleeve forming parts by the hollow cylindrical shell.

References Cited in the file of this patent

UNITED STATES PATENTS

| 1,707,213 | Lord | Mar. 26, 1929 |
| 1,729,328 | Chilton | Sept. 24, 1929 |
| 1,750,346 | Chilton | Mar. 11, 1930 |
| 1,931,945 | Zerk | Oct. 24, 1933 |
| 2,346,574 | Guy | Apr. 11, 1944 |
| 2,414,743 | Kaemmerling | Jan. 21, 1947 |
| 2,468,985 | Krotz | May 3, 1949 |

FOREIGN PATENTS

| 701,360 | France | Jan. 7, 1931 |